UNITED STATES PATENT OFFICE.

HARRY STUDDERT CULLEN, OF WELLINGTON, NEW ZEALAND, ASSIGNOR OF ONE-HALF TO GUY LESLIE FULTON, OF WELLINGTON, NEW ZEALAND.

FOOD PREPARATION AND PROCESS OF MAKING SAME.

1,373,651.     Specification of Letters Patent.     Patented Apr. 5, 1921.

No Drawing.     Application filed January 12, 1918. Serial No. 211,481.

*To all whom it may concern:*

Be it known that I, HARRY STUDDERT CULLEN, citizen of the British Empire, residing at 106 Wakefield street, city of Wellington, Dominion of New Zealand, have invented certain new and useful Improvements in Food Preparations and Processes of Making Same, of which the following is a specification.

This invention is for a preparation for use in substitution for eggs as a food or an ingredient in food and for a process of making same. The preparation is a thick-frothy cream in form and appearance the same as the whipped white of egg and which can be used for the same purposes and in the same way as beaten up fresh eggs. The preparation has for its ingredients first any albuminous byproduct of the highest quality preferred, capable of being used as food such as casein made from skim milk, secondly a non-injurious alkali such as sodium bicarbonate or any other similar element or compound which can be made equivalent to bicarbonate of soda in its effect on the casein by using other ingredients with it, thirdly fresh eggs and fourthly hot water. The process is as follows (the quantities being stated large to avoid fractions) :—Take say 15 oz. by weight of casein of best quality and grind it to a fine powder, add one oz. by weight of finely ground sodium bicarbonate and mix thoroughly and place this mixture in between 60 and 70 oz. by weight of hot water. Then briskly whip this compound for about 5 minutes and add 15 to 18 fresh eggs of an average weight of 2 oz. and beat up again for about 5 minutes and the result is the preparation as above described. The proportions of the ingredients stated are the best. The water may be varied to obtain the desired consistency and bicarbonate must be in a quantity not to spoil the cake. In use one half oz. of the mixture of casein and sodium bicarbonate before adding to the water is equivalent to one fresh egg of an average weight of 2 oz.

Directions for use—to make a three egg sponge cake, take 4 oz. hot water (nearly boiling), $\frac{3}{4}$ oz. casein, $\frac{1}{16}$ oz. sodium bicarbonate finely ground, whisk up for 5 to 10 minutes add 1 fresh egg whisk again for 5 to 10 minutes. This forms the thick frothy cream above referred to. Then proceed as usual to make the cake viz gradually add 6 ounces of sugar, whisk for 5 to 10 minutes add 6 oz. of flour, $\frac{1}{4}$ oz. baking powder sifted together, drop into plates and bake in a moderate oven. To make a $\frac{1}{2}$ lb. cake (pound to pound) :—

Take $3\frac{1}{4}$ oz. hot water (nearly boiling), $\frac{3}{4}$ oz. casein, $\frac{1}{16}$ oz. bicarbonate soda, beat for 5 to 10 minutes, then add 2 eggs whisk again for 5 minutes. This forms the thick frothy cream above referred to. Then proceed as usual—viz., take $\frac{1}{2}$ lb. butter or margarin, $\frac{1}{2}$ lb. sugar, beat together to a cream, add the frothy cream to butter cream then add (10 oz. plain flour, $\frac{1}{2}$ oz. baking powder) 1 lb. fruit, $\frac{1}{4}$ lb. peel, bake in a slow oven.

I claim :—

1. An egg substitute, comprising casein, sodium bicarbonate, hot water and fresh eggs, mixed together in the approximate proportions by weight respectively of 15 parts, 1 part, 65 parts, and 30 parts.

2. The process of making an egg substitute which consists in grinding and mixing together approximately 15 parts by weight of casein, and 1 part of sodium bicarbonate, pouring the mixture into 65 parts of hot water, whipping the hot mixture for approximately five minutes, adding thereto 30 parts of fresh eggs, and whipping to a creamy mass.

In testimony whereof I have hereunto set my hand in presence of two subscribing witnesses.

HARRY STUDDERT CULLEN.

Witnesses:
 ANDREW JOHN PARK,
 GUY LESLIE FULTON.